C. ALT.
OPTICAL LENSES.

No. 183,443.  Patented Oct. 17, 1876.

Witnesses:
H. C. Wattenberg.
Chas. Nida

Inventor:
Charles Alt
per G. M. Lympton
Atty

UNITED STATES PATENT OFFICE.

CHARLES ALT, OF NEW YORK, N. Y.

IMPROVEMENT IN OPTICAL LENSES.

Specification forming part of Letters Patent No. 183,443, dated October 17, 1876; application filed May 9, 1876.

*To all whom it may concern:*

Be it known that I, CHARLES ALT, of the city, county, and State of New York, have invented a new and useful Improvement in Optical Lenses; and that the following is a full, clear, and exact description of the same, reference being had to the accompanying drawings, and to the letters of reference marked thereon, making a part of this specification.

This invention is in the nature of an improvement in optical lenses; and the invention consists in optical lenses constructed with a film of enamel, covering wholly or in part one or both sides of the lenses, as is hereinafter more particularly described.

The necessity of protecting the eyes from the effects of direct or unshaded light is well known. This has been accomplished to a certain extent by the use of different-colored glasses; but the use of these glasses, as ordinarily constructed, but imperfectly accomplished the result, for the reason that if the glasses used for this purpose were colored throughout their entire substance, (as is generally the case,) then, when these glasses are formed into lenses, they are robbed in a measure of the beneficial effects of the coloring, for if the lenses to be produced are convex lenses, it is obvious that the thinner portion of the glass will be of a very much lighter shade than will be the thicker or central portion of the glass; and if the lenses be concave lenses, the thinner portion of the lens—*i. e.*, the center—will lose almost entirely the tint or color of the glass, while the surrounding portion of the same will be deeply colored, so that not only will the wearer of such lenses be to a certain extent deprived of the benefits to be derived from the tinted glass, but the eyes will be strained by being compelled to look through media of different density of color.

If the glasses used are of plain surfaces, and not lenses, a perfect shade may, of course, be obtained from glass that is colored throughout its entire substance; but in this case the optical effect is lost, the glass not being a lens. Then, again, if an optical glass be constructed with two foci, by my invention such a lens may be more cheaply constructed, and be better than are such lenses as at present constructed, if it is desired that only one part of the lens shall be tinted or colored.

Figure 1:
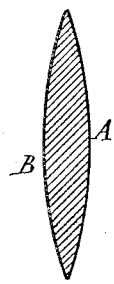
Figure 2:
Figure 3:
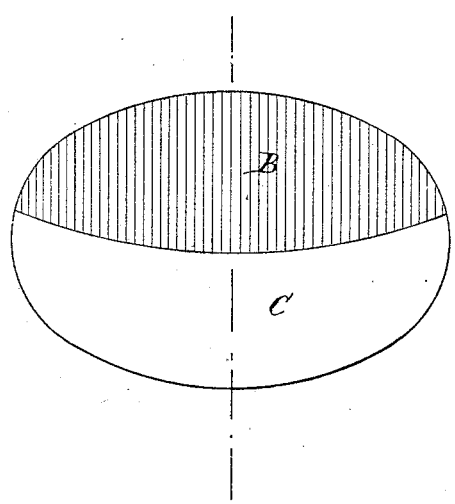
Figure 4:

In the accompanying sheet of drawings, Figures 1 and 2 are cross-sections of lenses. Fig. 3 is a plan view of my invention; and Fig. 4 is a cross-section of same.

Similar letters of reference indicate like parts in the several figures.

A represents a lens, which may be constructed for any purpose desired. This lens is ground to the required form, and polished by the ordinary means used for such purpose. It having been in this way substantially finished, a thin film of any desired enamel, B, of any requisite color, is carefully and evenly spread upon any portion of the lens it is desired to color.

The lens thus prepared is subjected to a temperature necessary to fuse the enamel on the lens, and the result is, wherever the enameling has been placed, whether upon the whole surface of the lens, or upon only part of it, the glass will assume a tint corresponding to the color of the enamel placed upon it; and since this enameled surface is of uniform thickness, it is necessarily of uniform shade throughout, notwithstanding the lens to which it may be applied may have an irregular or curved surface, so that the requisite shade is afforded the eyes, and the sight is not strained by having media of different shades opposed to it.

Another advantage derived from my invention is, that optical lenses may be constructed of one piece of glass, and yet the lens be partly colored, as shown in Fig. 3, B representing the enamel surface, and C the plain surface, of the lens.

Lenses of this description heretofore constructed would be necessarily made of glass with a colored surface, and the portion intended to be left free from color would have to be ground down and polished, whereas by my invention the entire lens is first completed, and then enameling is applied to any part desired, with the result before mentioned.

Having thus described my invention, what I claim as new, and desire to secure by Letters Patent, is—

An optical lens made of a homogeneous piece of glass, covered wholly or in part with enamel, substantially as and for the purpose described.

CHARLES ALT.

Witnesses:
H. L. WATTENBERG,
G. M. PLYMPTON.